(12) United States Patent
Lees

(10) Patent No.: US 6,916,144 B2
(45) Date of Patent: Jul. 12, 2005

(54) WHEEL NUT ASSEMBLY

(75) Inventor: Sydney John Lees, Walsall (GB)

(73) Assignee: Wheelsure Limited (GB)

(*) Notice: Subject to any disclaimer, the term of this patent is extended or adjusted under 35 U.S.C. 154(b) by 0 days.

(21) Appl. No.: 10/333,303

(22) PCT Filed: Jul. 18, 2001

(86) PCT No.: PCT/GB01/03211
§ 371 (c)(1),
(2), (4) Date: May 30, 2003

(87) PCT Pub. No.: WO02/08618
PCT Pub. Date: Jan. 31, 2002

(65) Prior Publication Data
US 2003/0185651 A1 Oct. 2, 2003

(30) Foreign Application Priority Data
Jul. 21, 2000 (GB) .............................. 0017800

(51) Int. Cl.⁷ .............................................. F16B 35/04
(52) U.S. Cl. ..................... 411/13; 411/214; 411/215
(58) Field of Search ................................ 411/214, 215, 411/221, 244, 13, 14

(56) References Cited

U.S. PATENT DOCUMENTS

| | | | |
|---|---|---|---|
| 184,582 A | * 11/1876 | Buckner | 411/215 |
| 549,101 A | * 11/1895 | Bode | 411/214 |
| 699,020 A | * 4/1902 | Schaefer | 411/215 |
| 1,241,181 A | * 9/1917 | Wilhelm | 411/215 X |
| 1,413,024 A | 4/1922 | Harrell | |
| 1,490,024 A | 4/1924 | Quinn | |
| 1,529,979 A | 2/1925 | Broughton | |
| 5,391,032 A | * 2/1995 | Vassalotti | 411/214 |

FOREIGN PATENT DOCUMENTS

| | | |
|---|---|---|
| GB | 659484 | 10/1951 |
| GB | 2 036 908 | 7/1980 |
| GB | 2 335 721 | 9/1999 |
| WO | WO 98/32617 | 7/1998 |

* cited by examiner

Primary Examiner—William L. Miller
(74) Attorney, Agent, or Firm—Keusey, Tutunjian & Bitetto, P.C.

(57) ABSTRACT

A wheel nut assembly for fixing a wheel to a vehicle hub. The wheel nut assembly has a wheel nut. The wheel nut has an internal thread. The wheel nut assembly further includes a wheel stud having an external thread adapted to co-operate with the internal thread of the wheel nut. The wheel stud further has an internal thread. A retaining member has an external thread of an opposite hand with respect to the internal thread of the wheel stud for cooperating with the internal thread of the wheel stud. A locking member is adapted to engage both the retaining member and the wheel nut to prevent relative movement there between and is further adapted to permit a location of the retaining member to be visually identified when the locking member is engaged to both the retaining member and the wheel nut.

22 Claims, 4 Drawing Sheets

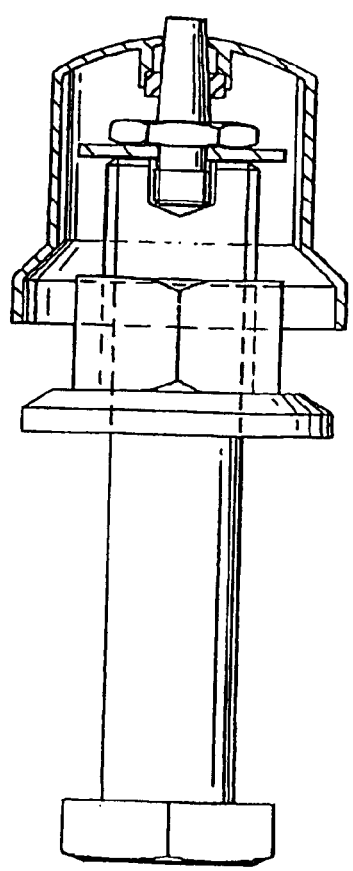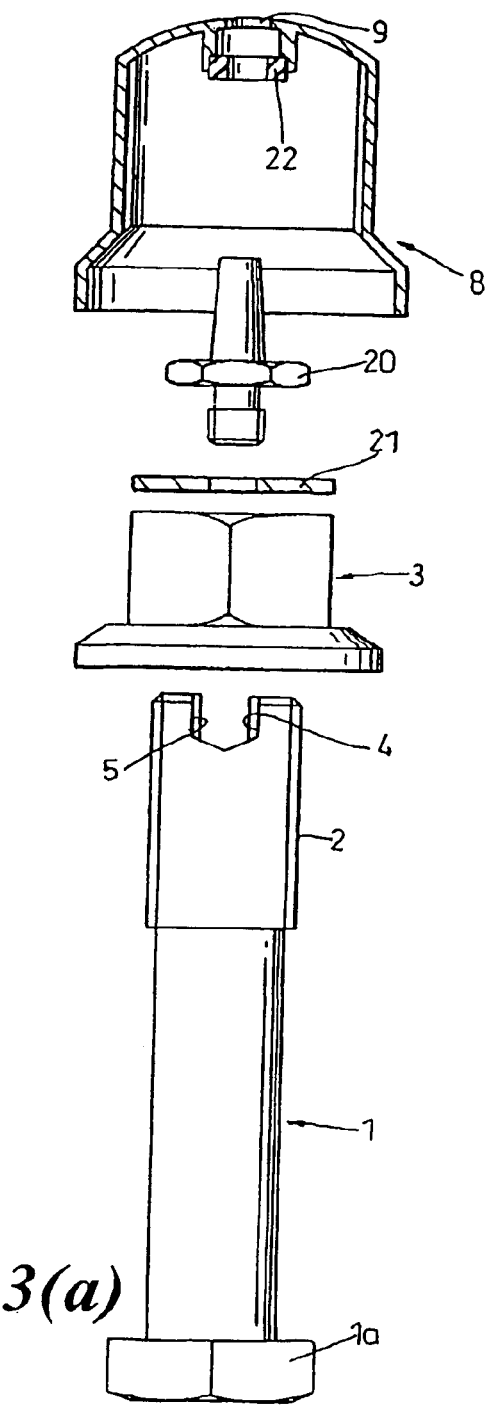
*Fig. 3(b)*
*Fig. 3(a)*

WHEEL NUT ASSEMBLY

FIELD OF THE INVENTION

This invention relates to improvements in a method and apparatus for mounting and retaining a wheel onto a hub, and in particular relates to fixings for vehicle wheels.

DESCRIPTION OF RELATED ART

It is known to fix a wheel onto a vehicle hub using a plurality of wheel studs which are fixed to the hub and a plurality of wheel nuts with one nut provided for each stud. The studs usually have an external threaded portion which is adapted to co-operate with a corresponding internal threaded portion of the wheel nut. Such a wheel nut assembly will hereinafter be referred to as being of the kind set forth.

Modern vehicle wheels, especially those for use on commercial vehicles, comprise a rim portion and a nave or wheel disc. The nave joins the rim to the wheel centre, and is welded to the rim. Alternatively, one piece wheels are sometimes employed in which the rim and the nave are integral parts. To assemble the wheel to the vehicle hub, the wheel is first positioned so that the wheel is concentric with the hub and the wheel studs project through openings in the nave or disc. The wheel nuts are then tightened onto the studs. Because the nuts are of a larger diameter than the openings through which the studs are passed, the wheel is firmly clamped in place, by the nut against the hub.

Whilst the wheel nut assembly of the kind set forth is widely used to mount wheels on vehicles, there is a serious problem with the nuts working loose. In a worst case, if all the nuts work loose, the wheel can release itself from the hub with potentially catastrophic results. In practice, even if only one of the nuts retaining a wheel is loose, this will place extra loading on the adjacent nuts which causes them to start to work loose. It is not unknown for a whole wheel to work free within 20 minutes of a single nut starting to vibrate loose.

One solution to the problem of wheel loss is taught from British patent application GB 9701533.3. In this application, a wheel nut assembly is provided of the kind in which a wheel stud is adapted to receive a wheel nut of a first handed thread. The wheel nut also includes a bore with an internal thread of opposite hand to that which receives the wheel nut. This opposite hand thread receives a looking bolt or retaining member. A locking cap is then placed over both the wheel nut and the retaining member. This locking cap co-operates with both the cap and the wheel nut. Because the wheel nut and retaining member have opposing threads the nut will not work free. A small retaining magnet located in the cap holds it securely in place.

Whilst the above arrangement provides a significant improvement over the existing art the applicant has appreciated that in its most rudimentary form as outlined above several disadvantages are present over the use of a simple wheel nut assembly. Firstly, because the cap covers the wheel nut and retaining member, a visual inspection of the location of the nut or retaining member cannot be made without first removing the cap. This is time consuming for a set of nuts on a wheel. Secondly, the magnet may work loose from its fastening onto the cap. Finally, in cases where the cap is shaped to resemble a hexagonal nut for aesthetic reasons, a driver may attempt to "tighten" the cap with a wrench under the mistaken belief that it is a wheel nut. This can cause catastrophic damage to the cap. Even if the cap is removed, the provision of the retaining member may impede location of a socket body onto the wheel nut for tightening.

SUMMARY OF THE INVENTION

It is an object of at least one aspect of the present invention to ameliorate one or more of the above mentioned problems.

In accordance with a first aspect, the invention provides a wheel nut assembly comprising:

a wheel stud having a first portion having a first external thread which is adapted to co-operate with an internal thread provided on a wheel nut and a second portion having a thread of the opposite hand to the first external thread which co-operates with a retaining member having a thread which is of the same hand as the second threaded member, and a locking member which is adapted to engage both the retaining member and the wheel nut to prevent relative movement therebetween, and in which the locking member is so constructed and arranged to permit the location of the retaining member to be visually identified whilst the locking member is in place.

Preferably, the locking member comprises a cap that may completely or partially cover the wheel nut and the retaining member. The cap may be provided with an opening which permits viewing of at least a part of the retaining member.

The retaining member may extend at least part way through the opening which can conveniently be located in an end face of the cap. For example, the retaining member may in one arrangement comprise a threaded bolt which is received within an internal threaded bore in the stud. An end portion of the bolt may be extended axially away from the bore to pass through the opening in the end face of the cap.

The portion of the retaining member that passes through the opening may be of a different colour to the external surface of the cap that surrounds the opening to make it easier to identify. The protruding portion may be fluorescent to aid identification in low-light conditions.

The locking member may be a snap-fit onto the wheel nut, the wheel stud or the retaining member. For example, the locking member may comprise a cap with an inwardly directed protrusion that co-operates with a groove or lip on one of the other components. Of course, other forms of "snap-fit" engagement are envisaged within the scope of the invention.

In an alternative, the cap may also include a magnet in addition to the snap-fit engagement.

The retaining member may be so constructed and arranged to permit location of a socket onto the wheel nut without removing the retaining member.

An advantage of such an arrangement is that it allows the wheel nut to be tightened down using a socket without removing the retaining member.

Where the wheel nut has a standard hexagonal profile and retaining member comprises a bolt, it is preferred that the maximum radial extent of the retaining member away from its central axis is smaller than the minimum radial extent of the flats of the wheel nut. In this case, the wheel nut can be engaged by an appropriate socket body for any position of the retaining member. Of course, this assumes that the retaining member is axially aligned with the wheel nut.

The retaining member may comprise a bolt which is received in an internal bore provided in the wheel stud. Alternatively, it may comprise a retaining nut which is received upon a threaded extension of the wheel stud. In each case, the minimum radial extent of the head of the retaining member must be larger than the inner thread diameter of the wheel nut.

The retaining member may, in an alternative, comprise at least two discrete components. It may comprise a washer and a retaining bolt or nut, the washer being held between one face of the wheel nut and the head of the retaining bolt or retaining nut. In this case, a smaller nut or bolt may be used as long as the diameter of the washer exceeds the internal threaded diameter of the wheel nut. The locking member may be adapted to co-operate with both the wheel nut and the bolt or nut of the retaining member.

The washer may have a circular outline or may have another irregular shape. It may be made of a different material to the retaining nut or bolt. The washer may be aluminum for lightness with the nut or bolt being of ferrous material. The cap may be provided with a magnet, or several magnets, that engage the nut or bolt.

An advantage of such a two-part construction for the retaining member is that weight can be saved. A retaining member made from one piece of ferrous material would be heavier for a similar size.

BRIEF DESCRIPTION OF THE DRAWINGS

There will now be described, by way of example only, several embodiments of the present invention with reference to the accompanying drawings of which:

FIG. 3(a) is an exploded cross-sectional view and 3(b) is a corresponding assembled view of a third embodiment of a wheel nut assembly in accordance with the present invention.

DETAILED DESCRIPTION OF PREFERRED EMBODIMENTS

Figures 1A, 1B:
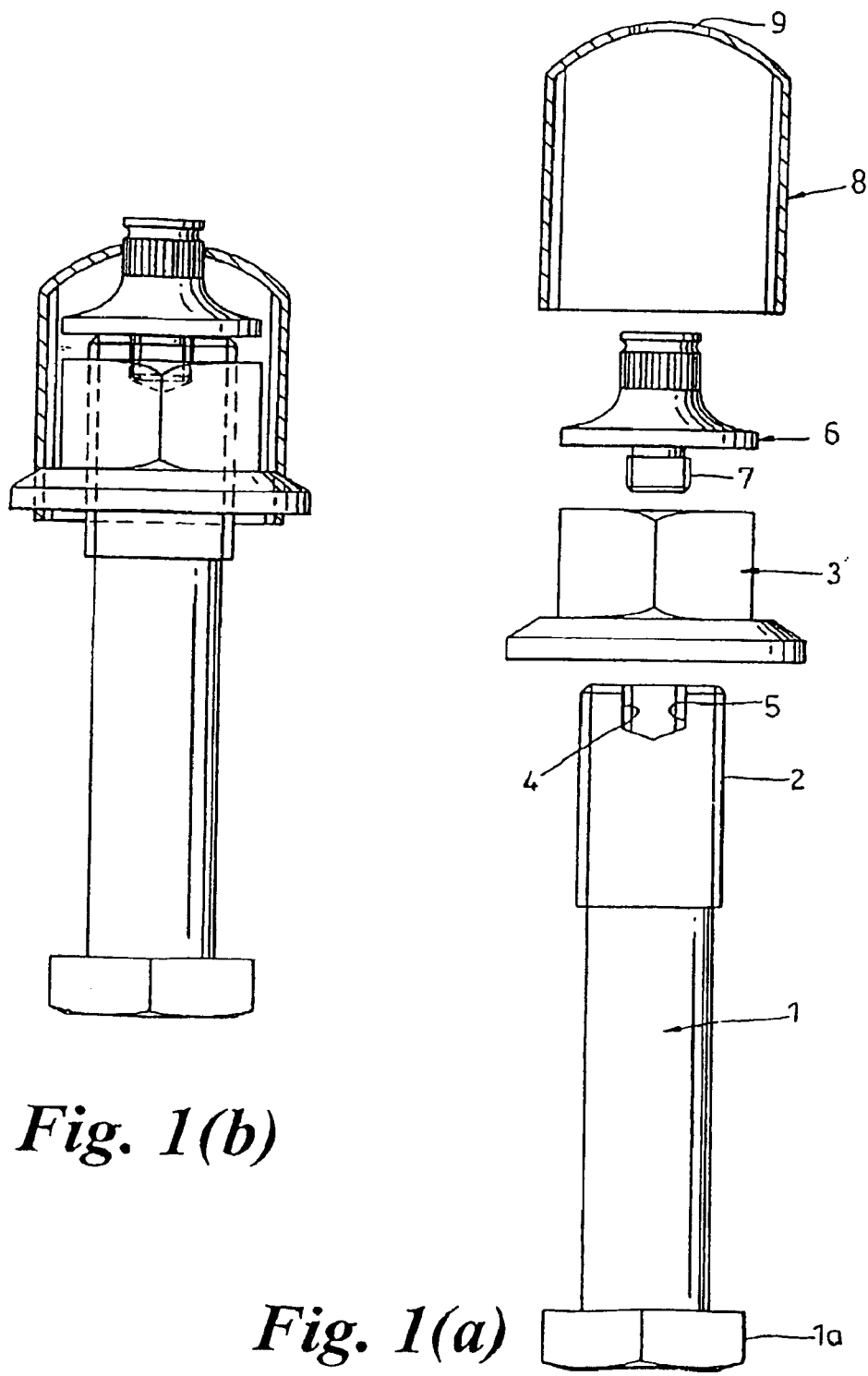
FIG. 1(a) is an exploded cross-sectional view and 1(b) is a corresponding assembled view of a first embodiment of a wheel nut assembly in accordance with the present invention.

A first embodiment of the present invention is shown in an exploded form in FIG. 1(a) of the accompanying drawings and in its assembled form in FIG. 1(b).

The wheel nut assembly comprises a stud 1 which is attached at one end 1a onto a hub (not shown). The stud 1 can be welded in place. The stud 1 has an external thread 2 provided over at least its uppermost portion spaced from the hub. A wheel nut 3 is adapted to threadedly engage with the stud 1 by means of an internal thread (not shown) which co-operates with the external thread 2 on the stud 1. The nut 3 may be tightened to the required torque using a socket or wrench and acts to trap a part of the vehicle wheel (not shown) onto the wheel hub.

The thread 2 on the stud 1 is of greater length than the thickness of the nut 3 so that when the wheel nut is fully tightened onto the stud, an end portion of the stud 1 protrudes from the wheel nut 3.

An internal bore 4 is provided in the protruding end portion of the stud distal from the wheel hub 2. The internal surface of the bore 4 is provided with a thread 5 which is of the opposite hand to the external thread 2.

A retaining member is provided in the form of a bolt having a head 6 and a threaded shank 7 that is complementary to the internal thread 5 in the bore 4. The bolt can be tightened into the bore 5 by engagement of thread 7 with thread 5 and turning the bolt in the opposite direction to that required to tighten the wheel nut 2.

Figure 4A:
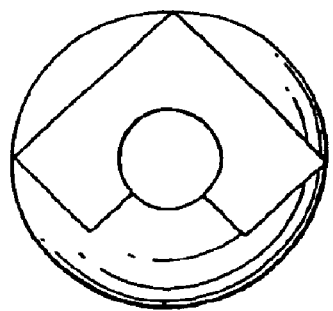
FIG. 4 is a view of the locking cap used in FIGS. 1 to 3 of the accompanying drawings (a) from above, (b) from the side; and (c) from underneath the cap.
Figure 4B:
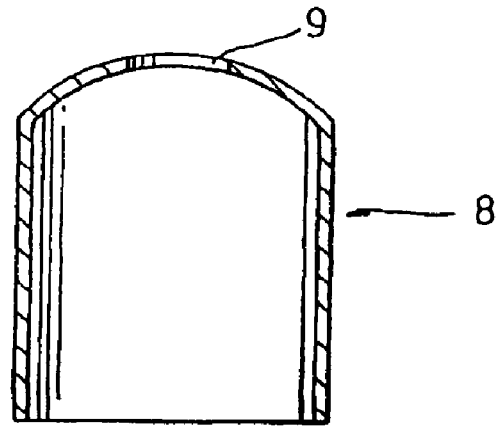
Figure 4C:
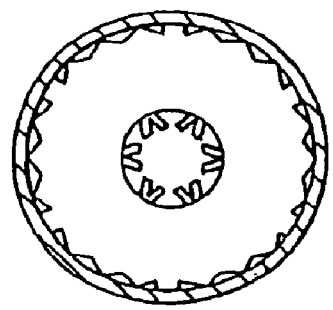

A locking means in the form of a cap 8 is also provided. The locking cap 8 is adapted to fit over and co-operate with both the wheel nut 3 and retaining bolt 6. The inside of the cap 8 has a multi-faced profile, as shown in FIG. 4 of the accompanying drawings. When fitted, the inside of the cap co-operates with the wheel nut 2.

The head 6 of the retaining bolt 6 has a stepped outline and in use extends through an opening 9 provided in the end of the cap 8. This allows the location of the retaining member to be visually identified. The opening in the cap has a profile that complements that of the bolt 6 so that when fitted the cap prevents rotation of the bolt 6. A small groove around the head 6 also protrudes through the cap 8 and can receive a circlip (not shown) that prevents accidental release of the cap 8 from the bolt 6.

The outer face of the cap is provided with indicia, in the example in the form of an arrow. This enables the orientation of the cap to be visually identified from a distance. Also, the portion of the retaining member that protrudes through the opening of the cap has a different color to that of the cap surrounding the opening so that it can be easily identified.

Several modifications are envisaged within the scope of the invention as typified by the alternative embodiments of FIGS. 2 and 3 of the accompanying drawings. Where possible the reference numerals used in FIG. 1 have been used in FIGS. 2 and 3 to denote like components.

Figures 2A, 2B:
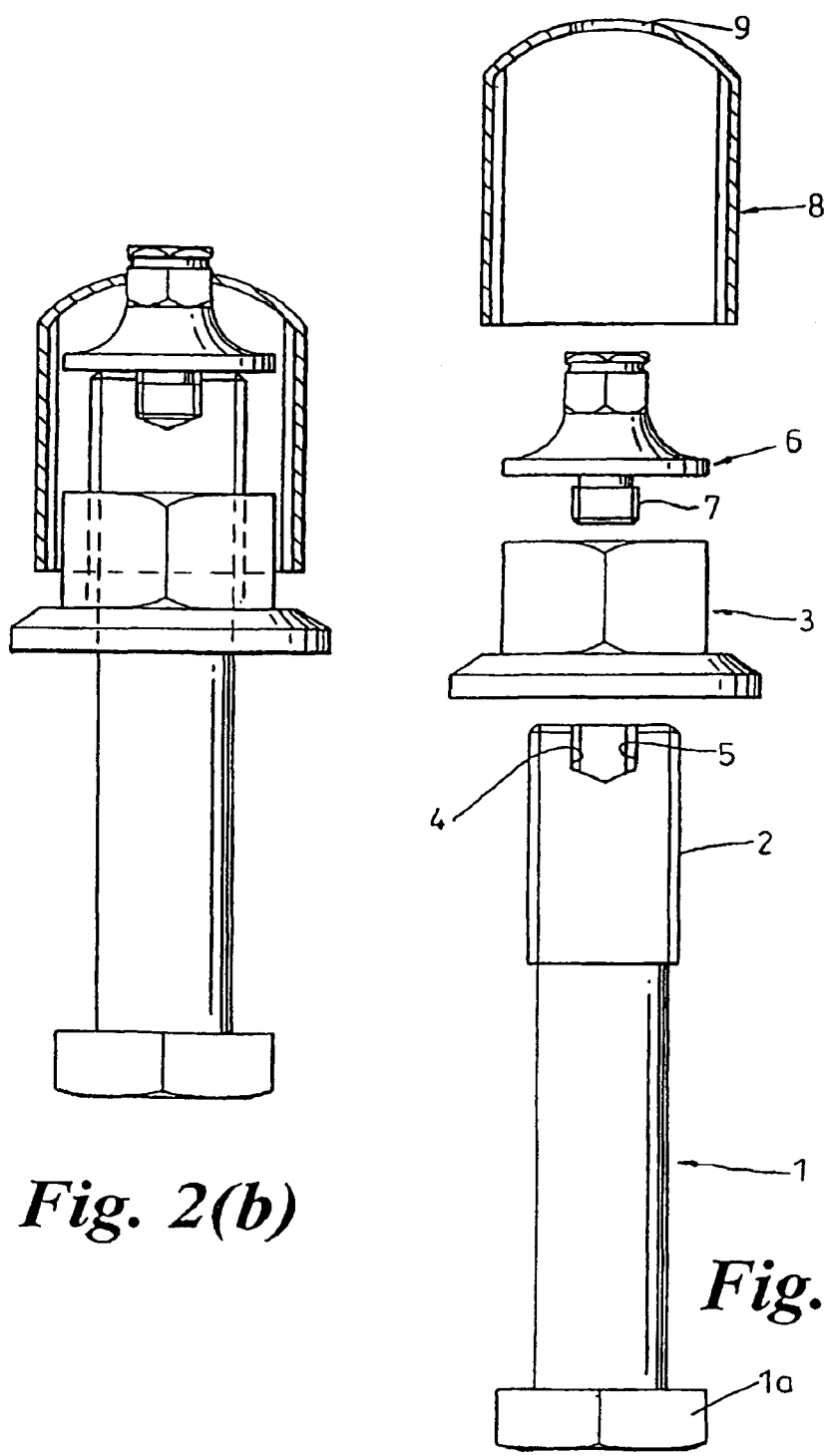
FIG. 2(a) is an exploded cross-sectional view and 2(b) is a corresponding assembled view of a second embodiment of a wheel nut assembly in accordance with the present invention.

In the alternative embodiment shown in FIGS. 2(a) and 2(b) of the accompanying drawings, the portion of the retaining member that extends through the cap has fewer facets, as does the complementary opening in the cap 8. This restricts the number of possible combinations of cap and retaining member angular position.

In a still further modification shown in FIG. 3(a) and FIG. 3(b) of the accompanying drawings the one-piece retaining member of the first and second embodiments is substituted by a two-part retaining member. The retaining member comprises a bolt 20 and a washer 21 which is located between the head of the bolt 20 and the wheel nut 2. The washer 21 is manufactured from a light weight material, such as aluminum, whilst the bolt is manufactured from a ferrous material. A circular magnet 22 is provided on the cap to retain the cap 8 to the bolt 20.

What is claimed is:

1. A wheel nut assembly for fixing a wheel to a vehicle hub, the wheel nut assembly having a wheel nut, the wheel nut having an internal thread, the wheel nut assembly further comprising:

a wheel stud having an external thread adapted to co-operate with the internal thread of the wheel nut, and further having an internal thread;

a retaining member having an external thread of an opposite hand with respect to the internal thread of the wheel stud for cooperating with the internal thread of the wheel stud; and a locking member adapted to engage both the retaining member and a perimeter of the wheel nut to prevent relative movement there between and further adapted to permit a location of the retaining member to be visually identified when the locking member is engaged to both the retaining member and the perimeter of the wheel nut.

2. The wheel nut assembly of claim 1, wherein the locking member comprises a cap that at least partially covers the wheel nut and the retaining member.

3. The wheel nut assembly of claim 2, wherein the cap is provided with an opening which permits viewing of at least a part of the retaining member.

4. The wheel nut assembly of claim 3, wherein the cap comprises an end face, the opening is located at the end face, and at least a portion of the retaining member extends at least partially through the opening.

5. The wheel nut assembly of claim 4, wherein the cap comprises an external surface that surrounds the opening, and the portion of the retaining member that extends at least partially through the opening is of a different color to the external surface of the cap that surrounds the opening.

6. The wheel nut assembly of claim 4, wherein the portion of the retaining member that extends at least partially through the opening is fluorescent.

7. The wheel nut assembly of claim 4, wherein the retaining member further includes another portion that does not extend through the opening, the portion of the retaining member that does extend at least partially through the opening has fewer facets than the other portion that does not extend through the opening, and the locking member has a complementary arrangement of facets with respect to the fewer facets of the portion of the retaining member that does extend at least partially through the opening to restrict a number of possible combinations of locking member and retaining member angular position.

8. The wheel nut assembly of claim 1, wherein the locking member is adapted to snap-fit onto at least one of the wheel nut, the wheel stud and the retaining member.

9. The wheel nut assembly of claim 1, wherein the retaining member further has a head portion, the head portion having a groove adapted to receive a clip to prevent accidental release of the locking member from the retaining member.

10. The wheel nut assembly of claim 1, wherein the locking member has an outer face having indicia disposed thereon to permit the location of the retaining member to be visually identified when the locking member is engaged to both the retaining member and the wheel nut.

11. The wheel nut assembly of claim 1, wherein the retaining member comprises a bolt and a washer, the bolt has a head, the washer is adapted to be disposed between the head of the bolt and the wheel nut.

12. The wheel nut assembly of claim 11, wherein the bolt comprises a ferrous material and the locking member further comprises a magnet to retain the locking member to the bolt.

13. The wheel nut assembly of claim 12, wherein the magnet has a circular shape.

14. A wheel nut assembly for fixing a wheel to a vehicle hub, the wheel nut assembly further comprising:
- a wheel stud having an external thread adapted to co-operate with an internal thread of a wheel nut and further having a bore and an internal thread disposed within the bore;
- a retaining member having an external thread of an opposite hand with respect to that of the internal thread of the wheel stud for cooperating with the internal thread of the wheel stud; and
- a locking member adapted to engage both the retaining member and a perimeter of the wheel nut to prevent relative movement there between and further adapted to permit a location of the retaining member to be visually identified when the locking member is engaged to both the retaining member and the perimeter of the wheel nut.

15. The wheel nut assembly of claim 14, wherein the locking member comprises a cap that at least partially covers the wheel nut and the retaining member.

16. The wheel nut assembly of claim 15, wherein the cap is provided with an opening which permits viewing of at least a part of the retaining member.

17. The wheel nut assembly of claim 16, wherein the cap comprises an end face, the opening is located at the end face, and at least a portion of the retaining member extends at least partially through the opening.

18. The wheel nut assembly of claim 17, wherein the cap comprises an external surface that surrounds the opening, and the portion of the retaining member that extends at least partially through the opening is of a different color to the external surface of the cap that surrounds the opening.

19. The wheel nut assembly of claim 14, wherein the retaining member further has a head portion, the head portion having a groove adapted to receive a clip to prevent accidental release of the locking member from the retaining member.

20. The wheel nut assembly of claim 14, wherein the retaining member comprises a bolt and a washer, the bolt has a head, the washer is adapted to be disposed between the head of the bolt and the wheel nut.

21. The wheel nut assembly of claim 14, wherein the locking member is adapted to snap-fit onto at least one of the wheel nut, the wheel stud and the retaining member.

22. A wheel nut assembly for fixing a wheel to a vehicle hub, the wheel nut assembly having a wheel nut, the wheel nut having an internal thread, the wheel nut assembly further comprising:
- a wheel stud having an external thread adapted to co-operate with the internal thread of the wheel nut, and further having an internal thread;
- a retaining member having an external thread of an opposite hand with respect to the internal thread of the wheel stud for cooperating with the internal thread of the wheel stud; and
- a locking member adapted to engage both the retaining member and the wheel nut to prevent relative movement there between and further adapted to permit a location of the retaining member to be visually identified when the locking member is engaged to both the retaining member and the wheel nut, wherein the locking member is adapted to snap-fit onto at least one of the wheel nut, the wheel stud and the retaining member.

* * * * *